United States Patent
Davis et al.

[15] 3,682,198
[45] Aug. 8, 1972

[54] FLUID FLOW DIRECTION SWITCHING MEANS

[72] Inventors: Billy Eugene Davis, 1131 East 19th St., Tulsa, Okla. 74120; Ronald G. Dunegan, 4972 South Newport, Tulsa, Okla. 74105

[22] Filed: Nov. 23, 1970

[21] Appl. No.: 92,005

[52] U.S. Cl. .....137/625.43, 137/625.25, 15/104.06, 73/3
[51] Int. Cl. ............................................F16k 11/06
[58] Field of Search......137/596, 268, 625.2, 625.69, 137/625.48, 625.43, 625.37, 625.33, 625.25; 73/3; 15/104.06

[56] References Cited

UNITED STATES PATENTS

| | | | |
|---|---|---|---|
| 2,867,237 | 1/1959 | Allingham | 137/625.43 X |
| 3,530,897 | 10/1968 | Buchanan | 137/625.25 X |
| 2,782,801 | 2/1957 | Ludwig | 251/324 X |
| 2,772,561 | 12/1956 | Plank et al. | 73/3 |
| 3,295,357 | 1/1967 | Halpme et al. | 73/3 |
| 3,541,837 | 11/1970 | Davis et al. | 73/3 |

FOREIGN PATENTS OR APPLICATIONS

| | | | |
|---|---|---|---|
| 878,501 | 10/1961 | Great Britain | 137/625.43 |

*Primary Examiner*—Alan Cohan
*Assistant Examiner*—Robert J. Miller
*Attorney*—Head & Johnson

[57] ABSTRACT

A fluid flow switching means for diverting the flow of fluid selectably in opposite directions through a measuring barrel including flow diverting cylinder means having a fluid inlet opening, a fluid outlet opening, a first measuring chamber opening and a second measuring chamber opening, plunger means axially positionable in said cylinder means operable between first and second operating positions, and a first and second seal member sealably positioned in said cylinder means and positionable by said plunger means between said openings whereby in one operating position of said plunger means fluid is diverted out said first measuring chamber opening and in the second operating position fluid is directed out the second measuring chamber opening.

13 Claims, 4 Drawing Figures

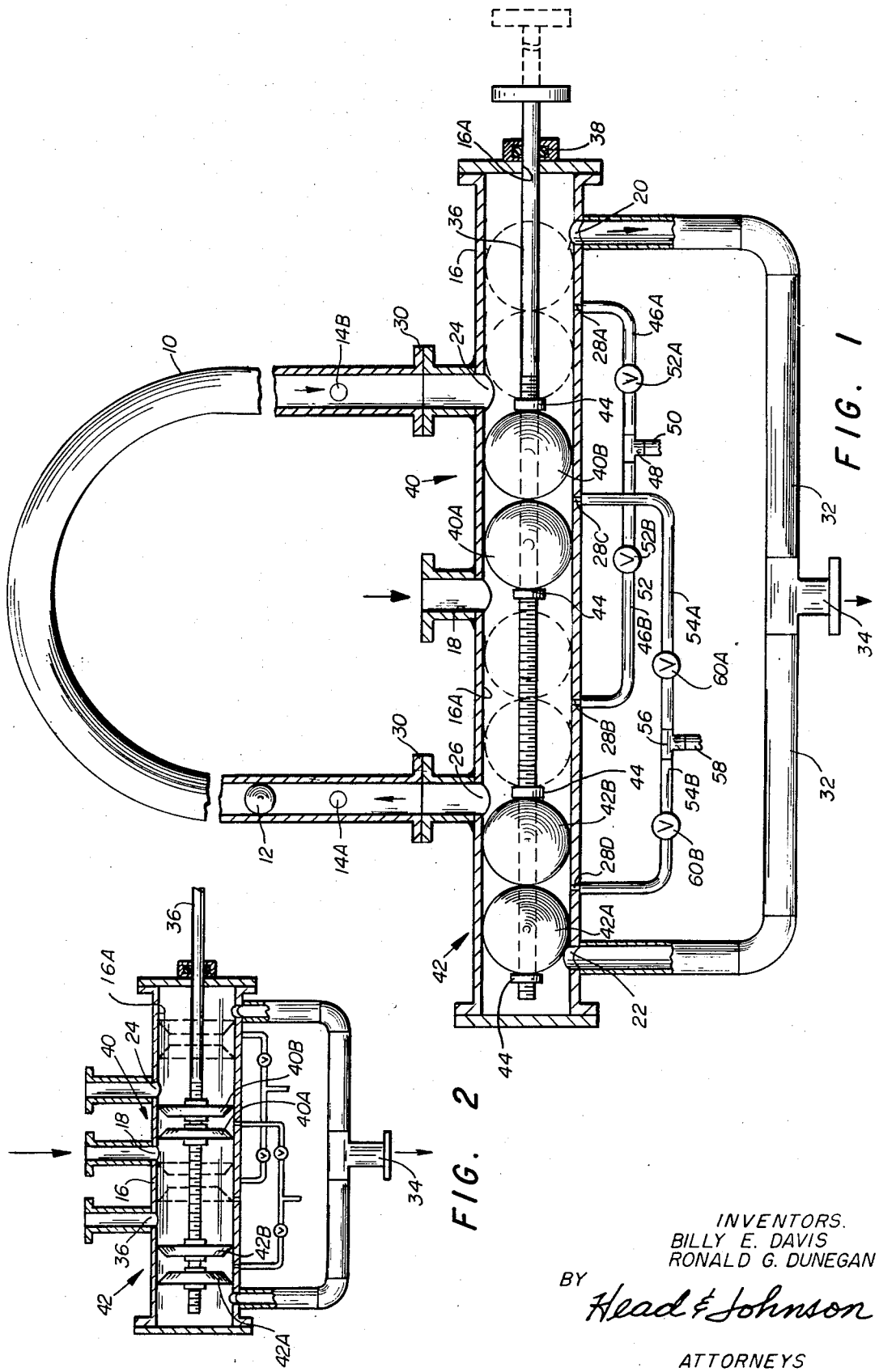
INVENTORS.
BILLY E. DAVIS
RONALD G. DUNEGAN
BY Head & Johnson
ATTORNEYS

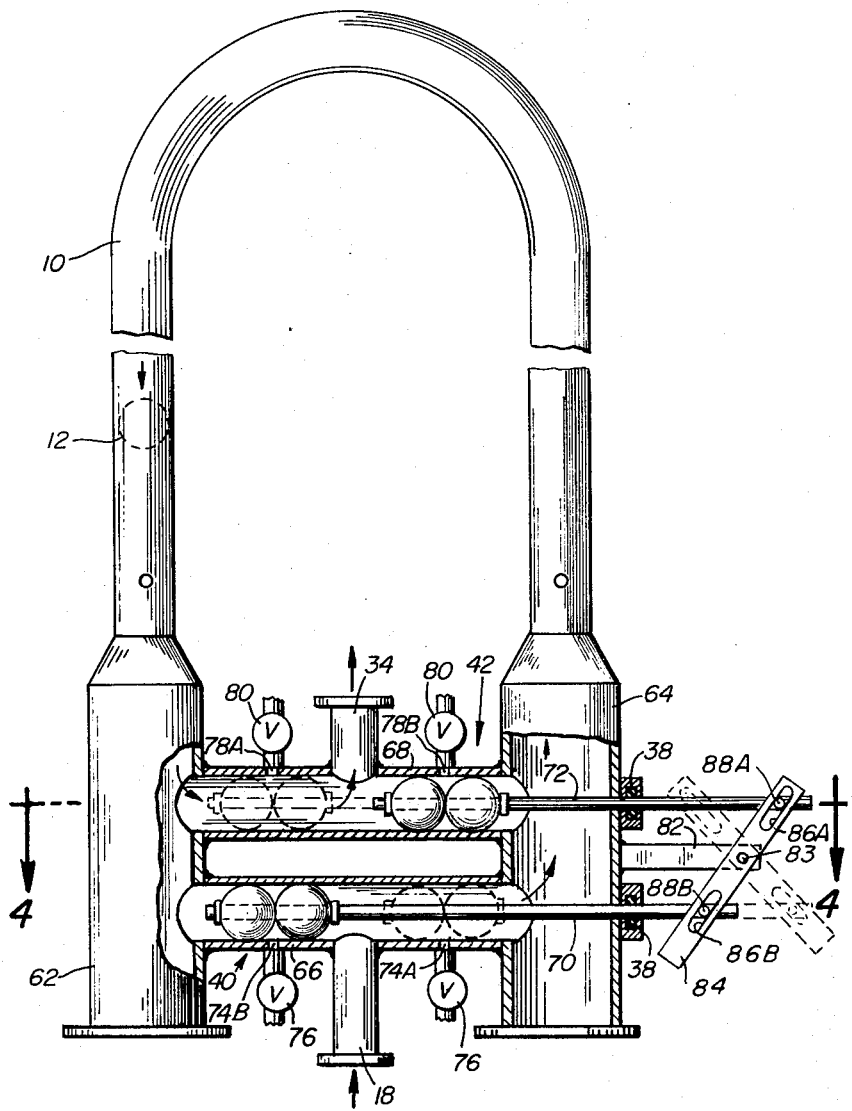
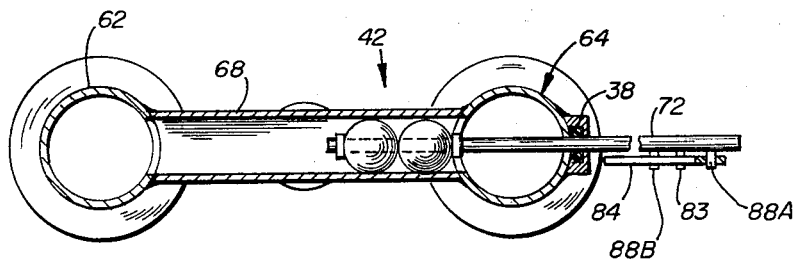
FIG. 4
INVENTORS.
BILLY E. DAVIS
RONALD G. DUNEGAN
BY
*Head & Johnson*
ATTORNEYS 3,682,198

FLUID FLOW DIRECTION SWITCHING MEANS

BACKGROUND AND OBJECTS OF THE INVENTION

In the petroleum industry, as well as other industries in which the measurement of fluid is done with meters, it is important that meters be calibrated to insure accuracy. A well known means of calibrating a meter is to flow fluid through the meter and into a constant diameter measuring chamber having a piston therein. The piston is moved by the flow of fluid from one preselected point to another, and the quantity of fluid necessary to move the piston is accurately known. Noting the meter readings at the beginning and end of piston movement gives an indication of the meter accuracy. Since some variation in the actuation of piston detecting means may occur, it has become customary in meter proving to flow the fluid passing through the meter such that in one flow direction the piston is moved in one direction through the calibrating barrel and then the direction of fluid flow is reversed and the piston is moved in the opposite direction through the calibrating barrel. Workers in the art have various means of switching the direction of fluid flow including manifolding valves together. As an improvement on manifold valves others have devised multi-port valves. The advent of multi-port valves is an important advancement over the manifold valve arrangement in that only one structure is required and thereby the amount of piping necessary is greatly reduced. In addition, multi-port valves do not require linkage mechanisms. Present types of multi-port valves, however, are not completely successful in that it is extremely difficult to provide leakproof sealing of the valve gate member. This problem increases as the size of the valve increases. The petroleum industry sometimes utilizes provers of up to 30 inches in diameter. Manufacturing a completely leakproof multi-port valve having 36 inch diameter valve ports is extremely difficult and expensive.

It is an object of this invention to provide an improved fluid flow direction switching means for directing the flow of fluid selectably in opposite directions, the switching means having particular application for use in meter provers.

A more particular object of this invention is to provide a fluid flow direction switching means capable of providing leakproof switching especially in high volume applications in which the components required to manufacture the switching means are readily available.

These general objects as well as other and more specific objects of the invention will be understood by reference to the accompanying description and claims taken in conjunction with the drawings.

DESCRIPTION OF THE VIEWS

FIG. 1 is a top view of a fluid flow direction switching means according to the invention as applied to change of the direction of fluid flow through a meter prover.

FIG. 2 is a view of the fluid flow switching means of FIG. 1 in much reduced scale and showing the use of disc-type sealing members.

FIG. 3 is a top view of an alternate arrangement of the fluid flow direction switching means of this invention as applied to the control of fluid in opposite directions through a measuring barrel.

FIG. 4 is a cross-sectional view taken along the line 4—4 of FIG. 3.

DETAILED DESCRIPTION

The flow direction switching means will be described as it particularly relates to the direction of fluid in opposite directions through a calibrating barrel, although the invention is by no means limited to this application. Reference may be had to copending application Ser. No. 736,752 filed June 13, 1968 now U.S. Pat. No. 3,541,837, entitled "Calibrating Barrel" for a more detailed discussion on the use, application and method of operating a calibrating barrel. Generally a calibrating barrel 10 (see FIG. 1) functions by flowing fluid in one direction causing the movement of a piston which may be in the form of a sphere 12. The piston 12 is moved past indicators 14A and 14B. When the sphere 12 passes indicator 14A it initiates a timing signal during which the amount of fluid passing through the meter being calibrated (not shown) is totaled. When piston 12 passes detector 14B the calibration stops. The flow of fluid is then reversed and the piston 12 is caused to move in the opposite direction and the procedure is repeated.

The fluid flow directing switching means of this invention includes a flow diverter cylinder means 16 which is closed at each end. One closed end has a small diameter axial opening 16A therein. The cylinder 16 includes a fluid inlet opening 18, a first fluid outlet opening 20, a second fluid outlet opening 22, a first measuring barrel opening 24, and a second measuring barrel opening 26. In addition the flow diverting cylinder 16 includes four small diameter test openings 28A through 28D.

The first measuring barrel opening 24 and second measuring barrel opening 26 are connected to the calibrating barrel 10, such as by means of flanges 30. First fluid outlet opening 20 and second fluid outlet opening 22 are connected together by means of a conduit 32 which extends to a common fluid outlet 34.

Axially positioned within the cylinder 16 is a plunger 36, a portion of which extends externally of the cylinder through opening 16A. Plunger 36 is axially and slidably supported within the cylinder 16, the opening 16A being sealed against fluid leakage such as by means of gasket 38.

Affixed to plunger 36 is a first seal member generally indicated by the numeral 40 and a second seal member generally indicated by the numeral 42. In the illustrated arrangement the first seal member 40 includes a first portion 40A and a second portion 40B, each of which is in the form of a sphere placed adjacent each other. In like manner the second seal member 42 includes a first portion 42A and an adjacent second portion 42B, each in the form of a sphere. The spheres 40A, 40B, 42A, and 42B are each of a diameter to sealably and slidably engage in the internal circumference 16A of the flow diverting cylinder. The spherical seal members are received on plunger 36 and are held in position by means of nuts 44.

Communicating with test opening 28A is a small diameter conduit 46A and in like manner communicating with test opening 28B is a small diameter conduit 46B. Conduits 46A and 46B meet at a tee 48, the tee communicating with a discharge outlet 50. In conduit 46A is a valve 52A, and in like manner, in conduit 46B is a valve 52B. The same arrangement is provided for test openings 28C and 28D, that is, conduits 54A and 54B extend to a tee 56 connecting to a discharge outlet 58, the conduits 54A and 54B having valves 60A and 60B therein.

OPERATION OF THE EMBODIMENT OF FIG. 1

Assuming the plunger 36 and the first and second seal members 40 and 42 are in the position shown in solid outline, fluid flowing through fluid inlet opening 18 passes directly to second measuring barrel opening 26, flows through the measuring barrel 10 moving piston 12 with it until the piston has been moved past the detector 14B. In the typical calibrating barrel arrangement some provision is made to catch the sphere 12 after it has passed the detectors without restricting the fluid flow, such provision not being illustrated here since the barrel itself does not form a part of the invention. Fluid flowing through barrel 10 flows back through opening 24 into the interior of flow diverting cylinder 16 and out through first fluid outlet 20 and by means of conduit 32 to common fluid outlet 34. As long as the plunger 36 is in the position illustrated the flow of fluid through the barrel 10 is in the same direction. When it is desired to reverse the direction of fluid flow plunger 36 is drawn outwardly to the point wherein the seal members 40 and 42 take positions illustrated in dotted outline. In this position fluid flows through inlet 18 into the flow diverting cylinder 16, through first measuring barrel opening 24, through measuring barrel 10 in the direction opposite that shown by the arrows, out of the measuring barrel through second measuring barrel opening 26 and back into the interior of the flow diverting cylinder 16, out second fluid outlet opening 22 and by means of conduit 32 to common fluid outlet 34. Thus by the axial displacement of plunger 36 from one operating position to another the direction of fluid flow through calibrating barrel 10 is changed.

FIG. 2 shows an alternate embodiment of the invention being different from FIG. 1 only in that instead of the portions of the seal members 40 and 42 being in the form of spheres, the portions 40A, 40B, 42A and 42B are each in the form of a disc having an external circumference sealably and slidably engaging the interior 16A of the cylinder. The discs may be in many forms, including gasketing means at the circumference for providing resilient contact with the cylinder.

Referring again to FIG. 1, a method is provided for testing the efficacy of the sealing contact between the seal members 40 and 42 and cylinder 16. In the operating position shown in solid outline test opening 28C communicates with the space between portions 40A and 40B of the first seal member. In like manner test opening 28B communicates with the space between portions 42A and 42B of the second seal member. If valves 60A and 60B are open no fluid pressure should exist at outlet 58. If, on the other hand, one of the seal member portions is leaking the pressure of fluid within the cylinder 16 will cause fluid to flow past the leaking seal member portion and into one of the test openings and thus out through the outlet 58. By this simple arrangement provision is made for testing the effectiveness of the seal members. It is important to remember that the accurate calibration of a meter requires that all fluid which flows through the meter during calibration must flow through barrel 10. If any fluid flows past a seal member 40 or 42 such fluid flow would not pass through the barrel 10 and therefore an inaccurate calibration of the meter would result.

When the plunger 36 is in the position shown in dotted outline valves 52A and 52B may be opened to perform the same test as previously described. When a test is not performed the valves 52A, 52B, 60A and 60B are closed to prevent leakage of the fluid from the cylinder 16 and to prevent the flow of fluid from one part to the other within the cylinder 16.

OPERATION OF THE EMBODIMENTS OF FIGS. 3 AND 4

Referring to FIG. 3 an alternate embodiment of the invention is shown. In this arrangement the barrel 10 includes an enlarged diameter first receiving chamber 62 at one end and second receiving chamber 64 at the other end. The chambers 62 and 64 are parallel to and spaced from each other. The enlarged diameter permits the chambers to receive piston 12 after it has passed through the barrel 10 and also permits the continuous fluid flow through the calibrating barrel after the piston has completed a passage.

In the arrangement of FIG. 3 the flow diverting cylinder is divided into two portions, that is, an inlet cylinder portion 66 and an outlet cylinder portion 68, the inlet and outlet cylinders 66 and 68 being parallel to and spaced from the other. Each of the cylinders 66 and 68 communicate at one end with the first receiving cylinder 62 and at the other end with the second receiving cylinder 64. Inlet cylinder 66 includes the fluid inlet opening 18 and the outlet cylinder 68 includes the fluid outlet 34.

Positioned within inlet cylinder 66 is a plunger 70 which is coaxial with the cylinder 66 and extends through the second receiving chamber 64 so that a portion thereof extends externally of the chamber. In like manner a plunger 72 is received coaxially within the outlet cylinder 68 and extends through the second receiving chamber 64, a portion thereof extending externally of the chamber. Each of the plungers 70 and 72 is sealed by a gasket means 38. First seal member, generally indicated by the numeral 40, is affixed to plunger 70 within inlet cylinder 66 and second seal member 42 is affixed to plunger 72 within outlet cylinder 68. As with the embodiment of FIG. 1 the seal members 40 and 42 of the embodiment of FIG. 3 are illustrated as being formed by pairs of spheres, however it can be seen that the seal members may be single entities. The use of the paired arrangement for each seal member is preferred since it provides means for testing the efficacy of the seal formed with the cylinders.

Inlet cylinder 66 includes test openings 74A and 74B each of which communicates with a valve 76. In like manner outlet cylinder 68 includes test openings 78A and 78B which communicate with valves 80.

The plungers 70 and 72 are preferably operating in unison to switch between operable positions. One arrangement for such operation is illustrated and includes a bracket 82 extending from the second receiving chamber 64. A lever 84 is pivotally supported to the outer end of the bracket 82. Lever 84 includes slots 86A and 86B. Slot 86A receives a trunion 88A which extends from plunger 72. In like manner slot 86B receives a trunion 88B which extends from plunger 70. When lever 84 is pivoted one of the plungers is forced inwardly while the other is forced outwardly so that the operating positions of both are changed concurrently.

With the plungers 70 and 72 in the position shown in solid outline fluid flows through inlet 18, through inlet chamber 66, and into second receiving chamber 64. Fluid flows through barrel 10, forcing piston 12 with it and into first receiving chamber 62. From thence fluid flows into the outlet cylinder 68 and through outlet opening 34. When the plungers 70 and 72 are moved into their other operable position, as shown in dotted outline, such as by moving lever 84 to the dotted position, fluid flows through fluid inlet 18, through inlet cylinder 66, into receiving chamber 62, through barrel 10, into second receiving chamber 64, through outlet cylinder 68 and to fluid outlet 34.

The fluid flow direction switching means of this invention has many advantages over existing types of fluid flow diverting devices. Unlike the arrangement including a manifold of valves there are no linkages to get out of order. In addition, in contrast to multi-port valves, no specially manufactured or machined portions are required. The diverting switching means can be constructed of pipe with standard flanges. The seal members 40 and 42 can be constructed of spheres, as shown in the views of FIGS. 1 and 3, which are standard items available in the industry and may be of the same type as the piston 12 which is used to pass through prover barrel 10. The device is easily checked by means of the test openings and valving arrangement for leakage. When wear occurs to one of the seal member portions it can be immediately detected and easily replaced.

The means shown of actuating the plunger 36 in the embodiment of FIG. 1, and plungers 70 and 72 in the embodiment of FIG. 3 is by hand operation. It can be seen that this may be accomplished by hydraulic or pneumatic cylinders, electric motor arrangements, and any number of various gearing arrangements. While the plungers may be moved by hand in smaller sizes of the flow direction switching means larger sizes make it mandatory that some type of mechanical apparatus be provided for removing the plungers.

While the invention has been described with a certain degree of particularlity it is manifest that many changes may be made in the details of construction and the arrangement of components without departing from the spirit and scope of this disclosure. It is understood that the invention is not limited to the embodiment set forth herein but is limited only by the scope of the attached claim or claims, including the full range of equivalency to which each element or step thereof is entitled.

What is claimed:

1. A fluid flow direction switching means for directing the flow of fluid selectable in opposite directions through a measuring barrel comprising:

flow diverter cylinder means having a fluid inlet opening, a fluid outlet opening, a first measuring barrel opening and a second measuring barrel opening;

plunger means axially slidable in said cylinder means and positionable between first and second operating positions; and a first and second seal member sealably received in said cylinder means and positionably by said plunger means between said openings whereby in one operating position of said plunger means fluid is diverted out said first measuring chamber opening and in said second operating position fluid is directed out said second measuring chamber opening in which said flow diverter cylinder means is in the form of an inlet cylinder and a paralleled outlet cylinder spaced from said inlet cylinder, said inlet cylinder having said inlet opening therein and said outlet cylinder having said outlet opening therein, and in which said plunger means is in the form of a first plunger member coaxially received in said inlet cylinder, and a second plunger member coaxially received in said outlet cylinder, each of said plunger members having a portion thereof extending externally of the said chamber in which it is positioned, said first seal member being affixed to said first plunger member in said inlet chamber and said second seal member being affixed to said second plunger member in said outlet chamber.

2. A fluid flow direction switching means for directing the flow of fluid selectably in opposite directions through a measuring chamber having a first and second opening, the switching means comprising:

an elongated flow diverting cylinder of uniform internal diameter having a first and second closed end, a fluid inlet opening intermediate the ends, a first fluid outlet opening adjacent the first end and a second fluid outlet opening adjacent the second end, a first measuring chamber opening intermediate said inlet opening and the first outlet openings and a second measuring chamber opening intermediate the inlet opening and the second outlet openings, the first end having a small diameter opening therein coaxial with the cylinder, the cylinder measuring chamber openings being communicable measuring chamber openings;

a plunger slidably positioned in said cylinder and having a portion thereof extending sealably through said cylinder small diameter opening, said plunger being slidably positionable between two operating positions;

a first and a second seal member affixed to said plunger in spaced relationship, each of said seal members being of a diameter to sealably and slidably engage said cylinder, the seal members being spaced from each other such that in one operable position of said plunger said first seal member is positioned between said fluid inlet opening and said first measuring chamber opening and said second seal member is positioned between said second fluid outlet and said second measuring chamber opening causing fluid flowing in through said fluid inlet to flow out through said second measuring chamber opening and in the other operable position of said plunger said first seal member is positioned between said first measuring chamber outlet and said first fluid outlet and second said seal is positioned between said second measuring chamber opening and said fluid inlet causing fluid flowing in through said fluid inlet to flow out through said first measuring chamber opening, each said seal member being formed of two spaced apart sealing portions and wherein said flow diverting cylinder includes four small diameter test openings therein, there being one test opening communicating between each sealing portion of each seal member in each of the said operating positions of said plunger; and valve means selectably closing said test openings.

3. A fluid flow direction switching means according to claim 2 in which each of said seal members consists of two adjacent spheres, the external diameter of each sphere engaging the internal diameter of said cylinder.

4. A fluid flow direction switching means according to claim 2 in which each of said seal members consists of two spaced adjacent disc members each affixed axially of and normal to said plunger, the circumference of each disc having sealing engagement with the internal diameter of said cylinder.

5. A fluid flow direction switching means according to claim 2, including conduit means connecting said cylinder first and second fluid outlet openings to a common fluid outlet.

6. A fluid flow direction switching means for directing the flow of fluid selectably in opposite directions through a measuring barrel comprising:

first and second spaced apart receiving chambers each having a measuring cavity opening therein communicating with a measuring barrel, and each having a fluid inlet and a fluid outlet opening, one of said receiving chambers having two spaced apart small diameter plunger openings therein;

an inlet cylinder communicating at one end with said fluid inlet opening in said first receiving chamber and at the other end with said fluid inlet opening in said second receiving chamber, and the inlet cylinder having a fluid inlet opening intermediate the ends;

an outlet cylinder spaced from and parallel said inlet cylinder and communicating at one end with said fluid outlet opening in said first receiving chamber and at the other end with said fluid outlet opening in said second receiving chamber, and the outlet chamber having a fluid outlet opening intermediate the ends, one of said receiving chamber plunger openings being in axial alignment with said inlet cylinder and the other being in axial alignment with said outlet cylinder;

a plunger coaxially and slidably positioned in said inlet cylinder and having a portion thereof extending sealably through one of said receiving chamber small diameter openings;

a plunger coaxially and slidably positioned in said outlet cylinder and having a portion thereof extending sealably through the other of said receiving chamber small diameter openings, each of said plungers having a first and second operable position;

a seal member affixed coaxially to each of said plungers slidably and sealably engaging the interior circumference of said inlet and outlet cylinders; and means of positioning said plungers between operable position so that in the first operable position said seal member affixed to said plunger in said inlet cylinder is positioned between said fluid inlet and said first receiving chamber and said seal member affixed to said plunger in said outlet cylinder is positioned between said fluid outlet and said second receiving chamber and in the second operable position said seal member in said inlet cylinder is between said fluid inlet and said second receiving chamber and said seal member in said outlet cylinder is between said fluid outlet and said first receiving chamber.

7. A fluid flow direction switching means according to claim 6 in which said seal members each consists of two spaced apart sealing portions and wherein said inlet and outlet cylinders each have two small diameter test openings therein, there being one test opening communicating between each sealing portion of each seal member in each of said operating positions of said plungers; and valve means selectably closing said test openings.

8. A fluid flow direction switching means according to claim 6 in which each said seal member is a sphere, the external diameter of which engages the internal circumference of the cylinder in which it is positioned.

9. A fluid flow direction switching means according to claim 7 in which each of said seal member consists of two adjacent spheres, the external diameter of each sphere engaging the internal circumference of the cylinder in which it is positioned.

10. A fluid flow direction switching means according to claim 6 in which each said seal member is a disc member affixed axially of and normal to said plunger, the circumference of each disc having sealing engagement with the internal diameter of the cylinder in which it is positioned.

11. A fluid flow direction switching means according to claim 7 in which each of said seal members consists of two spaced adjacent disc members each affixed axially of and normal to the said plunger to which it is affixed, the circumference of each disc having sealing engagement with the interior diameter of said cylinder.

12. A fluid flow direction switching means according to claim 6 in which said means of positioning said plungers between operable positions include means of simultaneously positioning said plungers.

13. A fluid flow direction switching means according to claim 12 wherein said means of simultaneously positioning said plungers include:

a bracket affixed to and extending from said second receiving chamber;

a lever pivoted to the outer end of said bracket; and trunion means extending from each of said plungers and pivotally received by said lever.

* * * * *